US006249970B1

(12) United States Patent
Cattaneo

(10) Patent No.: US 6,249,970 B1
(45) Date of Patent: Jun. 26, 2001

(54) METHODS OF MAKING A MOTOR VEHICLE STEERING WHEEL

(75) Inventor: Marco Cattaneo, Pavia (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/012,868

(22) Filed: Jan. 23, 1998

(30) Foreign Application Priority Data

Feb. 19, 1997 (IT) .............................................. MI97A0350

(51) Int. Cl.[7] .................................................... B21D 53/26
(52) U.S. Cl. ............................ 29/894.1; 74/552; 156/297
(58) Field of Search .......................... 29/894.1; 156/297; 74/552

(56) References Cited

U.S. PATENT DOCUMENTS

| 5,792,302 | 8/1998 | Nakada et al. | 156/293 |
| 5,840,144 | 11/1998 | Schumaker et al. | 156/267 |

FOREIGN PATENT DOCUMENTS

| 1630913 | 5/1970 | (DE) . |
| 19528788 | 8/1996 | (DE) . |
| 96418 | 7/1980 | (JP) . |
| 137671 | 9/1985 | (JP) . |
| 56737 | 7/1993 | (JP) . |
| 8-310407 | 11/1996 | (JP) . |

Primary Examiner—P. W. Echols
(74) Attorney, Agent, or Firm—Lonnie Drayer; Beth Vrioni

(57) ABSTRACT

Steering wheel comprising a drive rim consisting of an internal polyurethane core, covered at least partially with a coating of a material with an aesthetically finer quality. The steering wheel is manufactured starting from a driving rim with a polyurethane core by means of a procedure comprising the following steps: grinding of the surface of the polyurethane core, providing a coating element of wood having plane shape and size congruent to at least one portion of the polyurethane core, applying of the coating element to the polyurethane core and respective bending of the same by means of a hot press provided with a suitable template, removing the excess part of the coating element, honing of the portion of the rim coated by the coating element, and protective varnishing of the coated rim.

6 Claims, 3 Drawing Sheets

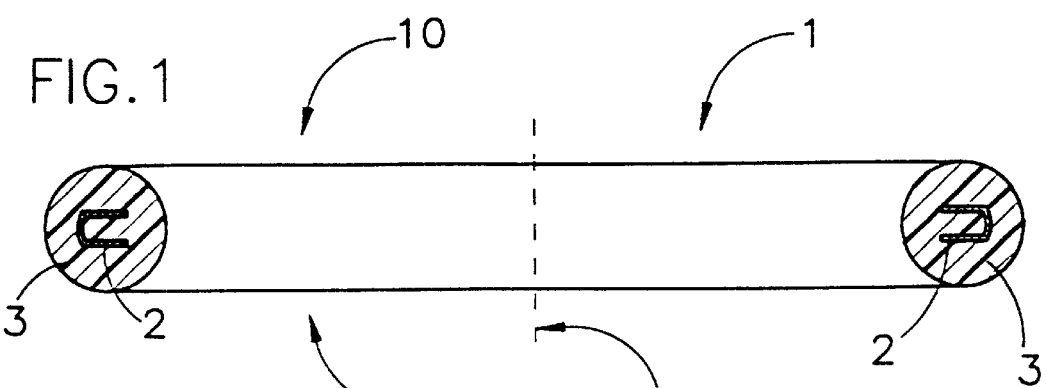
FIG. 1
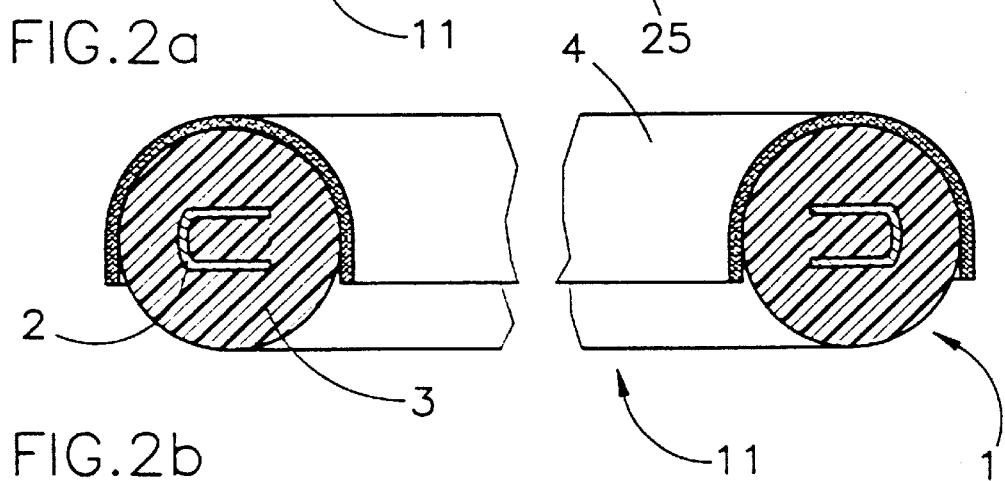
FIG. 2a
FIG. 2b
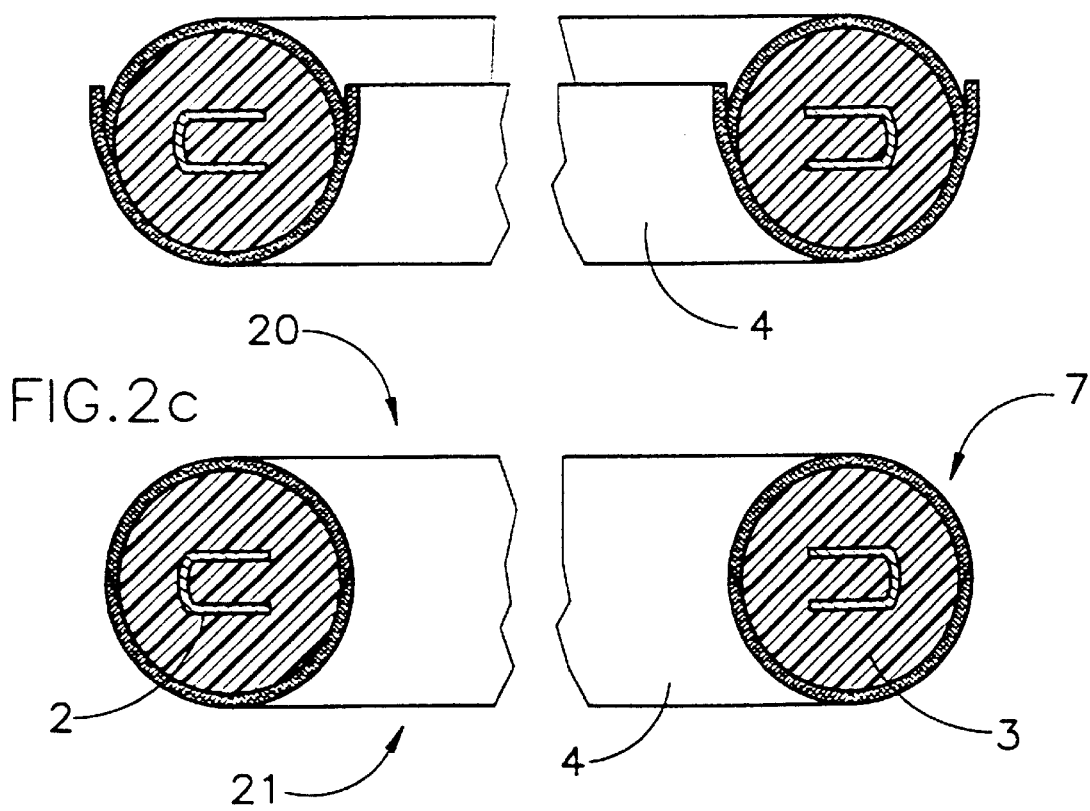
FIG. 2c

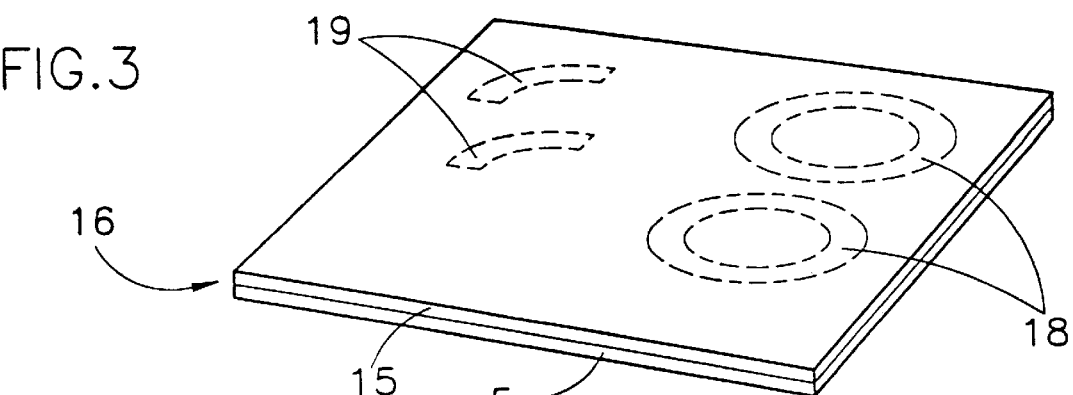
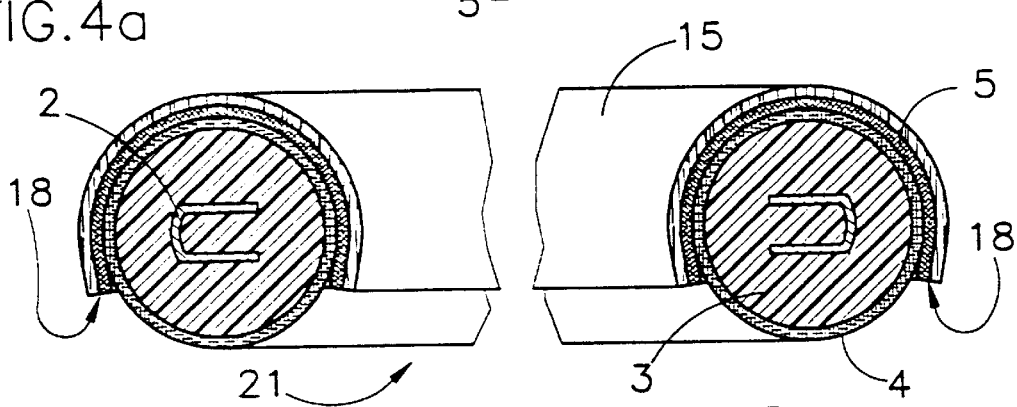
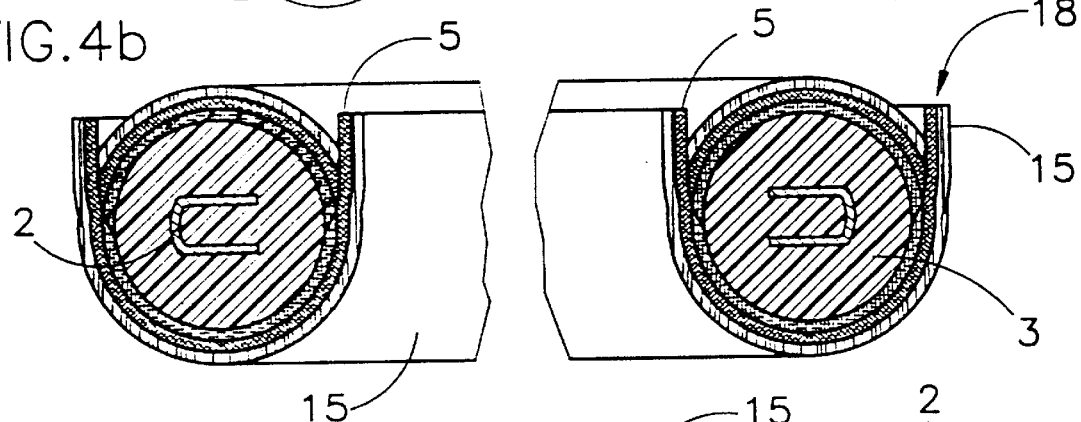
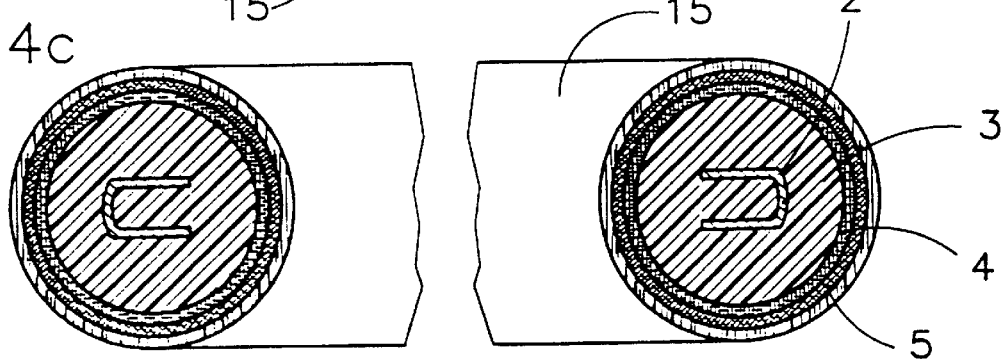

METHODS OF MAKING A MOTOR VEHICLE STEERING WHEEL

DESCRIPTION

The present invention refers to a steering wheel for motor vehicles and a procedure to make it.

In the field of accessories for motor vehicles there are known steering wheels having a rim made of a plastic material. There are also some known steering wheels of finer aesthetic quality in which the rim is made of solid wood.

The latter, in addition to being much more costly, are also heavier and they guarantee a lesser reliability in case of collision as compared to the more economical steering wheels with plastic rims.

In view of the state of the art described, the object of the following invention is to provide a steering wheel that would combine, the characteristics of a low cost, lightness and reliability in case of collision that are typical of the steering wheels with a plastic rim, with the characteristics of a finer aesthetic quality of the steering wheels with a solid wood rim.

According to the present invention, such object is attained by means of a steering wheel, characterised in that it comprises a rim consisting of an internal polyurethane core, covered at least partially with a coating of a material with an aesthetically finer quality.

According to the invention there is also provided a procedure for the making of a steering wheel for motor vehicles comprising a driving rim with a polyurethane core, characterised in that it comprises the following steps:

grinding of the surface of said polyurethane core,
providing a couple of coating elements of material with aesthetically finer quality having plane shape and size congruent to at least one portion of said polyurethane core,
applying said coating elements to said polyurethane core and respective bending of the same by means of a hot press provided with a suitable template,
removing part of said coating elements in excess,
honing of the portion of the rim coated by the coating elements,
varnishing the coated rim.

Preferably, in case it is desirable to coat the steering wheel with briar wood, said couple of coating elements are realised by shearing briar wood sheets available on the market in the suitable shape and dimensions.

If instead it is desirable to coat the steering wheel with a kind of wood with veining that would not consent to bending parallel to the veining itself, as for example mahogany wood, said couple of coating elements are realised by winding and gluing sheets of wood in a spiral to form a drum, from which plane rings of wood, or ring portions are subsequently created, by shearing or shear turning, which can be applied to said polyurethane core.

The characteristics of the present invention will be rendered even more evident by the following detailed description of some embodiments thereof, that are illustrated as non-limiting examples in the enclosed drawings, where:

FIG. 1 shows the diametric section of a core of a rim of a steering wheel according to the present invention, prior to its coating;

FIGS. 2a–2c show the initial steps common to a first and a second procedure according to the present invention;

FIG. 3 shows a sheet of briar wood for the coating of the core of the rim according to a first procedure of production according to the invention;

FIGS. 4a–4c show additional steps of said first procedure;

Figure 5:
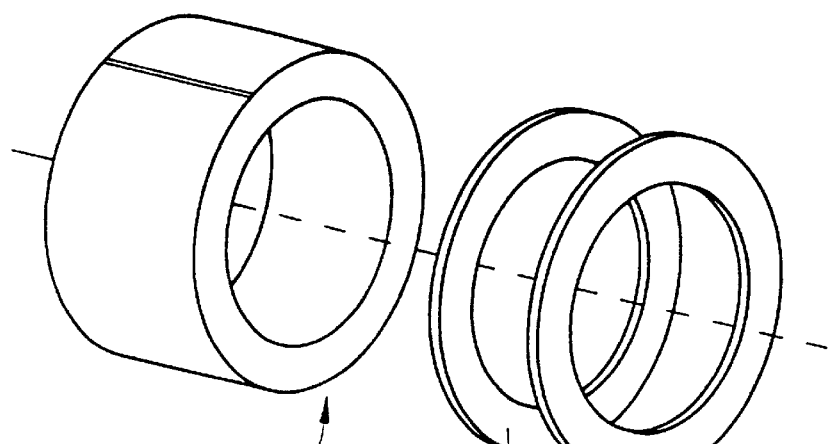
FIG. 5 shows a drum of wood for the production of coating elements according to a second procedure for the production according to the present invention.
Figure 6A:
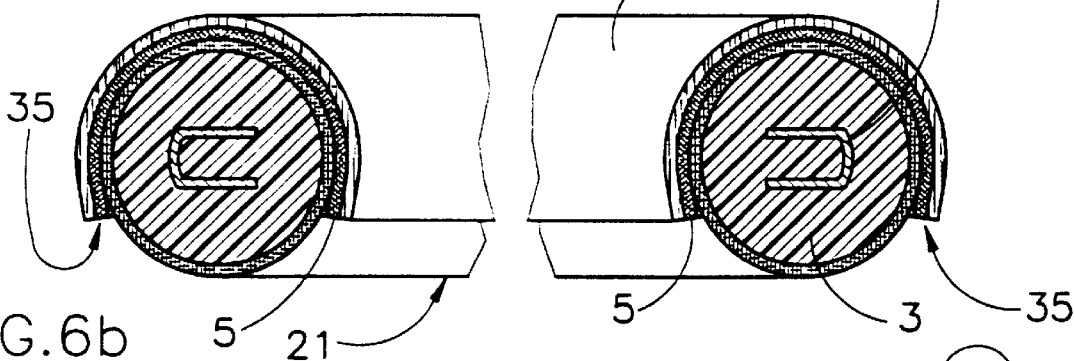
FIGS. 6a–6c show additional steps of said second procedure.
Figure 6B:
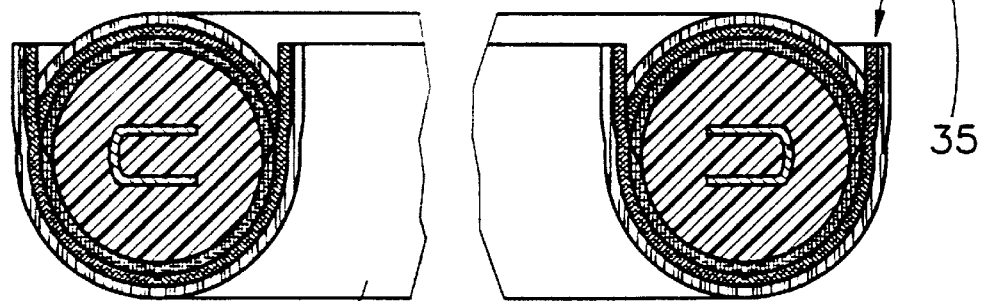
Figure 6C:
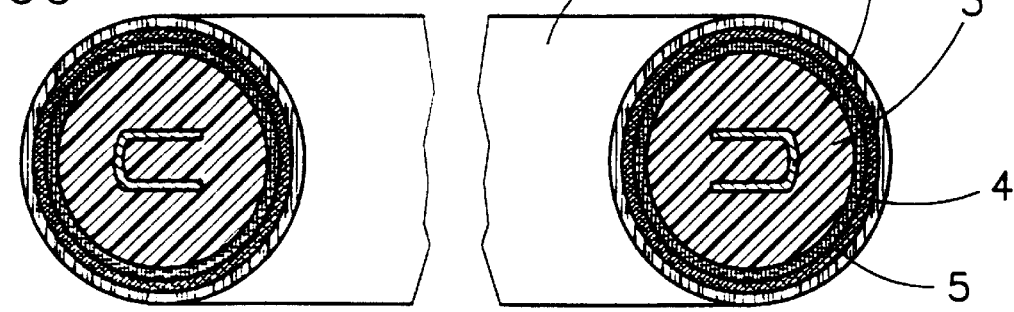

With reference to FIG. 1 it shows a section of a rim 1 according to a diametric plane passing through its axis 25; the rim 1 consists essentially of a core 3 of polyurethane and of a metallic reinforcement 2. Said rim 1 represents the basic elements from which to start to make a steering wheel according to the invention, for example through the two procedures of production that will be now described.

The first procedure refers to the manufacture of a steering wheel coated with briar wood.

The surface of said core 3 in polyurethane is ground at first and then coated with a fabric 4 of either natural or synthetic or glass fibre base or carbon base or other, or with wood, using suitable glues resistant to heat and humidity.

As shown in FIGS. 2a–2c, the coating of the core 3 with the fabric 4 is accomplished in several steps. A ring of fabric 4 with dimensions congruent to the polyurethane core 3 is applied on the upper part 10 of the rim 1 (FIG. 2a). Subsequently the parts of fabric 4 in excess are removed and another ring of fabric 4 is applied on the lower part 11 of the rim 1 (FIG. 2b). Then the part of the fabric 4 in excess is removed again (FIG. 2c).

A coating of reinforcement fabric 5 is applied to a surface of a sheet 15 of briar wood available on the market; the sheet 16 thus obtained is then sheared into plane rings 18 with size and shape congruent to the steering wheel to be manufactured (FIG. 3).

By means of a hot press provided with suitably shaped templates and by means of appropriate glues resistant to heat and humidity, said rings 18 are bent and glued on the polyurethane core 3 following the steps shown in FIGS. 4a–4c.

With reference to FIG. 4a, a ring 18 of briar wood and fabric is applied on the upper part 20 of the driving rim 7 previously coated with fabric. Subsequently the parts in excess of the ring 18 of briar wood and fabric are removed and another ring 18 of briar wood and fabric is applied on the lower part 21 of the rim 7 (FIG. 4b). Then once more the excess part of the ring of briar wood and fabric 18 applied to the lower part 21 of the rim 7 is removed, as shown in FIG. 4c.

Said rings 18 of briar wood and fabric can be formed by the assembly of more portions of rings 19 shown in FIG. 3, so as to get the most out of the sheet 16 of briar wood and fabric.

Afterwards there is a step of honing of the briar wood surface according to procedures substantially equal to those normally used for the honing of solid wood steering wheels.

Therefore the procedure provides for the varnishing of the briar wood with a thickness of varnish such as to guarantee the maximum aesthetic and functional quality and the protection of the wood underneath.

The second procedure of production illustrated in FIGS. 5, 6a–6c refers to the manufacture of a coated steering wheel or other kind of wood with veining that does not allow its bending parallel to the veining itself.

The surface of the rim 1 of FIG. 1 is at first ground and then coated with a retaining fabric 4 by means of appropriate glues resistant to heat and to humidity, according to steps substantially equal to those illustrated in FIGS. 2a–2c.

The manufacture of a couple of coating elements of wood requires more work as compared to the first procedure. As shown in FIG. 5, a sheet of mahogany wood or other wood of the aforementioned kind, is wound and glued in spiral so as to form a drum 30. From that drum rings of wood of plane shape are created, by means of shearing or shear turning. The manufacture of said drum 30 is made necessary by the employment of a kind of wood that, as said previously, has veining that does not permit bending in a direction parallel to it. In this way, instead, it is possible to give the wood rings the desired shape without problems of breakage of the same wood.

On the surface of the rings 31 that must be glued to the rim 7 previously coated by the fabric 4, a coating in reinforcement fabric 5 is preferably applied. The rings 35 in mahogany wood and fabric thus formed are glued by means of a hot press provided with templates suitably shaped by means of appropriate glues resistant to heat and humidity by following steps essentially analogous to those shown in FIGS. 6a–6c.

The honing of the mahogany wood surface then follows according to procedures substantially equal to those employed for the honing of solid wood steering wheels.

The subsequent varnishing of the mahogany wood is in polyester with the same characteristics indicated before.

With procedures analogous to the ones described it is possible to manufacture a steering wheel only partially covered with briar wood or wood, with the remaining part of another material, for example leather. In that case, in order to prevent unnecessary waste of material, the ring of wood is sheared into portions of rings sufficiently large so as to coat only the zone of the steering wheel of interest.

What is claimed is:

1. A method of making a steering wheel having a rim with a polyurethane core, comprising the steps of:
   a) grinding the surface of said polyurethane core of said rim;
   b) applying a retaining fabric to at least one portion of the polyurethane core;
   c) providing wood having a plane shape and size congruent to at least one portion of said polyurethane core by winding and gluing in spiral a sheet of wood until a drum is formed and subsequently shearing said drum perpendicular to its axis to form plane rings;
   d) applying a reinforcement fabric to the wood to form a coating element;
   e) applying said reinforcement fabric of said coating element to said retaining fabric on said polyurethane core;
   f) bending and gluing the coating element against the rim using a hot press provided with a suitable template;
   g) removing an excess part of said coating element;
   h) honing the wood of the coating element; and
   i) applying a protective varnish to the wood of said coating element.

2. A method of making a steering wheel according to claim 1, characterised in that said wood is mahogany wood.

3. A method of making a steering wheel having a rim with a polyurethane core, comprising the steps of:
   a) grinding the surface of the polyurethane core of said rim;
   b) applying a retaining fabric to at least one portion of the polyurethane core;
   c) applying a reinforcement fabric a the surface of a sheet of wood having a plane shape and size congruent to at least one portion of said polyurethane core to form a coating element;
   d) applying said coating element to said retaining fabric on said polyurethane core;
   e) bending and gluing the coating element on said polyurethane core using a hot press provided with a suitable template;
   f) removing an excess part of said coating element;
   g) honing the wood of the coating element; and
   h) applying a protective varnish to the wood of said coating element.

4. The method of making a steering wheel according to claim 3, wherein the retaining fabric is applied to the core with glue.

5. The method of making a steering wheel according to claim 3, wherein the coating wood is briar wood.

6. The method of making a steering wheel according to claim 3, wherein the step of providing a coating of wood further comprises winding and gluing in spiral a sheet of wood until a drum is formed and subsequent shearing of said drum perpendicular to its axis so as to form plane rings.

* * * * *